United States Patent
De Toffol et al.

(10) Patent No.: US 6,875,499 B1
(45) Date of Patent: Apr. 5, 2005

(54) LIGHT DIFFUSING COMPOSITES

(75) Inventors: Andrea De Toffol, Milan (IT); Alberto Luca Stasi, Milan (IT)

(73) Assignee: Elf Atochem S.A., Puteaux (FR)

( * ) Notice: Subject to any disclaimer, the term of this patent is extended or adjusted under 35 U.S.C. 154(b) by 0 days.

(21) Appl. No.: 09/487,287

(22) Filed: Jan. 19, 2000

(30) Foreign Application Priority Data

Jan. 22, 1999 (IT) .......................................... MI99A0121

(51) Int. Cl.[7] .............................. B32B 7/02; B32B 9/04; B32B 27/00; B32B 27/36; F21V 7/04
(52) U.S. Cl. .................... 428/212; 428/411.1; 428/412; 428/423.7; 385/901; 362/31
(58) Field of Search ................................ 428/212, 205, 428/174, 411.1, 412, 423.7; 385/146, 901; 362/31

(56) References Cited

U.S. PATENT DOCUMENTS

| | | | | |
|---|---|---|---|---|
| 4,479,061 A | * | 10/1984 | Koizumi et al. | ......... 250/487.1 |
| 4,988,550 A | * | 1/1991 | Keyser et al. | ............. 428/41.1 |
| 5,442,523 A | * | 8/1995 | Kashima et al. | ............... 362/31 |
| 5,710,856 A | * | 1/1998 | Ishii et al. | ................... 385/146 |
| 6,107,444 A | * | 8/2000 | Bruneau et al. | ............. 528/272 |

FOREIGN PATENT DOCUMENTS

| | | |
|---|---|---|
| EP | 0 242 308 A1 | 10/1987 |
| EP | 0 573 051 A1 | 12/1993 |
| EP | 0 724 181 A2 | 7/1996 |
| GB | 2 165 631 A | 4/1986 |
| WO | WO 97/01726 | 1/1997 |

* cited by examiner

Primary Examiner—Bruce H. Hess
Assistant Examiner—Lawrence Ferguson
(74) Attorney, Agent, or Firm—Arent Fox PLLC

(57) ABSTRACT

A thermoplastic material composite panel, comprising a transparent thermoplastic base layer, light conducting, having a thickness generally in the range 3–40 mm, and a light diffusing layer, having a thickness generally in the range 10–1500 micron, placed on one face of the base layer, said diffusing layer being characterized in that it contains barium sulphate in amount by weight, expressed as per cent ratio on the total weight of the diffusing layer, in the range 0.01–2%, the barium sulphate having average particle sizes in the range 0.1–50 micron, the composite sizes being-greater than or equal to 10 cm.

17 Claims, No Drawings

LIGHT DIFFUSING COMPOSITES

The present invention relates to a composite comprising at least a thermoplastic polymer layer, preferably based on acrylic polymers, and by one or two layers of a composition based on a thermoplastic material, preferably based on acrylic polymers, containing particles of a specific material light diffusing, said composite being usable for preparing luminous signs or displays also of remarkable sizes, having sides at least ≧10 cm, generally in the range 20 cm–2 m, preferably 20 cm–1 m, said signs being lit on one or more edges (edge lit), the sign area being greater than 100 cm² preferably greater than 600 cm².

More specifically the invention relates to sheets formed by a base sheet or base layer of methylmethacrylate copolymers with (meth)acrylic esters or (meth) acrylic acids, specifically methylmethacrylate/alkylacrylate copolymers, preferably ethyl acrylate, and by one or two distinct layers constituted by thermoplastic material, preferably the same of the described base sheet, containing particles of a specific material able to diffuse light, so to give luminous signs having a lighting as uniform as possible.

It is known in the art that conventional luminous signs are generally constituted by a frame on which sheets or panels of plastic material which contains dispersed particles able to diffuse light, are assembled. Generally light source is not placed on the edges but behind the panel (back lit). The main feature required by the back lit signs is that the sheets are sufficiently opaque so as to hide the source of light placed behind the sheet. The source of light is generally constituted by neon lamps. On the external side of the sheet the produced lighting is observed. The drawback of this type of sign resides in the high manufacture costs and in the remarkable electric power amount required for lighting.

In order to overcome these inconveniences in the prior art signs lit with lamps positioned edge lit with respect to the sign have been made by using thermoplastic material sheets containing particles diffusing the light dispersed in the mass. The luminous rays are diffused in the sheet by the diffusing particles dispersed in the thermoplastic polymer. Generally, also when a rather uniform intensity of the light on the sign surface is obtained, this is not very high.

From a practical point of view, it is very difficult to obtain a distribution as uniform as possible of the light, diffused on the sign surface, combined with a high intensity. This is the technical problem to be solved: to find compositions allowing to increase the diffused light intensity on the sign surface, and therefore to try to reduce the losses of luminous intensity diffused along the thermoplastic material. This problem becomes more difficult as the luminous sign size increases. Said problem does not arise when the panel sizes are very small, less than 10 cm, as for instance the miniaturized displays. In this case it is possible to obtain an intense and uniform diffused light on the panel. However, as said, this result does not give any suggestion for panels having sizes greater than those of the miniaturized displays, i.e. greater than or equal to 10 cm.

In GB patent 2,165,631 a small size (miniaturized) device light diffusing is described, substantially constituted by a first transparent base layer transmitting light, which is lit by a source of light positioned edge lit with respect to the layer, by a second layer diffusing light, containing a conventional diffusing light agent, and by a layer reflecting the light, which is on the external surface of the base layer. In the Examples it is mentioned that the panel has sides having sizes smaller than 6.5 cm, the miniaturized display area being 30 cm², and that the reflecting layer allows to obtain a diffused light on the display with sufficiently uniform luminous intensity and that titanium dioxide is used as light diffusing agent. In the patent it is also stated that the best results in brightness are obtained when the second layer contains titanium dioxide amounts in the range 0.1–0.3% by weight. Tests carried out by the Applicant have shown that at said concentrations of titanium dioxide it is not possible to uniformly light panels having sides greater than 10 cm, i.e. having sizes greater than the miniaturized displays (see the Examples).

The need was felt to have available sheets or panels for luminous signs or displays, lit by one or more lamps placed at the sides with respect to the sign or display, able to give an intense and homogeneous lighting as much as possible.

It has now been surprisingly and unexpectedly found a thermoplastic material panel meeting the above mentioned requirements, by using a composite with a specific diffusing light material as described hereinafter.

An object of the present invention is a composite panel of thermoplastic material, comprising a transparent thermoplastic base layer transmitting light, having a thickness generally in the range 3–40 mm, preferably 6–25 mm and a diffusing light layer, having a thickness generally in the range 10–1500 micron, preferably 30–1000 micron, placed on one or both parts of the base layer, said diffusing layer being characterized in that it is constituted by thermoplastic material containing barium sulphate in amount by weight, expressed as per cent ratio on the total weight of the diffusing layer, in the range 0.01–2%, preferably 0.1–0.8%, still more preferably 0.1–0.6%, the barium sulphate having average particle sizes in the range 0.1–50 micron, preferably 0.5–10 micron, the composite sides being at least ≧10 cm, generally in the range 20 cm–2 m, preferably 20 cm–1 m, said composite having on one or more edge lit, the composite area being greater than or equal to 100 cm², preferably greater than 600 cm².

The polymeric thermoplastic material of which the base layer and the diffusing layer containing barium sulphate are constituted, can be, for example, a (meth)acrylic (co) polymer, polycarbonate, polystyrene, PET, copolyesters constituted by glycol modified PET, such as for example diethylenglycol, butandiol, hexandiol and 1,4-cyclohexane dimethanol, or mixtures of PET and of these copolymers.

Specifically the (meth)acrylic thermoplastic (co)polymer can be constituted by an alkyl (meth)acrylate homopolymer or by a copolymer derived from an alkyl (meth)acrylate with at least one monomer having one or more ethylenic unsaturations copolymerizable with the alkyl (meth)acrylate.

As alkyl (meth)acrylate the compounds wherein the alkyl group has from 1 to 8 carbon atoms, for example methyl-, ethyl-, propyl-, isopropyl- and butyl-(meth)acrylate can be mentioned. The methyl methacrylate is a particularly preferred monomer.

Preferably the thermoplastic polymer is formed by methyl methacrylate homopolymers or methylmethacrylate copolymers with (meth)acrylic esters or (meth)acrylic acids, specifically methylmethacrylate/alkylacrylate copolymers, preferably ethyl acrylate.

The (meth)acrylic thermoplastic (co)polymer comprises from 70 to 100% by weight of alkyl methacrylate and from 0 to 30% by weight, preferably from 3 to 10% by weight, of one or more comonomers containing one or more ethylenic unsaturations, said comonomers copolymerizable with the alkyl methacrylate. These comonomers containing one or more ethylenic unsaturations are selected, for example, from $C_1$–$C_8$ alkylacrylates, styrene, substituted styrene, acrylonitrile, methacrylonitrile, $C_1$–$C_8$ alkyl methacrylates different from the alkyl methacrylate used as main comonomer, hydroxyalkyl acrylates and methacrylates, alkoxyalkyl or aryloxyalkyl acrylates and methacrylates wherein the alkylic group has from 1 to 4 carbon atoms, acrylamide, methacrylamide, acrylic acid, methacrylic acid, maleimides and $C_1$–$C_4$ alkylen glycol dimethacrylates.

The invention acrylic copolymers can be obtained with anyone of the known processes, for example by suspension or mass polymerization, according to well known prior art methods in the prior art. The polymerization takes place in the presence of a chain transfer agent, such as for example di-unsaturated monocyclic terpenes and mono-unsaturated bicyclic terpenes such as for example terpinolene; mercaptanes, such as t.-dodecyl mercaptane.

The sign composite panel according to the present invention can be produced by coextrusion, by casting, or by compression molding or by a film coupling in calendering or optionally by gluing, according to well known methods to the skilled in the art. Preferably the composite is prepared by coextrusion of the thermoplastic polymer base sheet and of the thermoplastic polymer diffusing layer containing the barium sulphate; or by compression molding of the diffusing layer of thermoplastic polymer containing the barium sulphate, obtained by extrusion, on a base sheet of the thermoplastic polymer, said sheet obtained by extrusion or by casting. Coextrusion is the preferred process to obtain panels constituted by the base layer and by the diffusing layer according to the present invention.

The composite panel edges are preferably polished according to known methods.

On one or more edges of the present invention composite panel, on which the source of light is not positioned, a reflecting film, such as for example Scotch 3M® polyester tape 850 film, alluminum. etc., can be placed.

Optionally the thermoplastic polymer of the base sheet can contain particles of substances diffusing light, both of polymeric and inorganic type. The average sizes of the polymeric particles are in the range 0.1–200 micron, preferably 0.1–50 micron, more preferably 1–15 micron, the amount is in the range 5–1000 ppm, preferably 100–200 ppm. Preferably the polymeric particles are substantially spherical. The inorganic particles have the above sizes for the diffusing surface layer and are used in the amounts indicated for the organic polymeric particles.

When the coextrusion is used the polymer melting temperature of the organic polymeric particles diffusing light must be higher than the extrusion temperature, generally higher than 250° C.

Optionally on the free surface of the composite base sheet, not joined to the diffusing layer, parallel adhesive bands, having a width from some millimeters to some centimeters, for ex. from 0.5 to 20 mm, placed at a distance, the one from the other, generally within the indicated limits, can be present, said distance can even be greater than the strip width, see for example EP 242,308. In this way the luminous intensity is still increased.

The following examples illustrate the invention, and do not limit the application scope of the same.

EXAMPLE 1

Description of the Lighting System

Lighting System A (on One Edge, with the Lamp Inside a Metallic Structure Having a Slit)

The lighting system consists of an Osram L 30W/20 neon lamp inserted inside a metallic structure closed except on one side, wherein an opening is present, centred with respect to the lamp, having sizes of about 8.5 mm of width and having the same lamp length. The composite panel lighting according to the invention is made at the side, by inserting for a depth of about 1 cm one edge of said panel inside the slit, so that the sheet edge is in practice in contact with the lamp. Under the panel, in contact with the same, an Altuglas 213 20493 opaque white sheet, 5 mm thickness produced by Atoglas, is placed.

Lighting System B (on One Edge, with an Aluminum Sheet Wound Around the Lamp and Partially Covering the Panel)

The lighting system consists of a Philips Reflex TL 5–13 W lamp, on which a side edge of the composite panel is leant. An aluminum sheet is wound around the lamp to cover the two panel surfaces up to a distance of about 5 cm from the edge in contact with the lamp. The aluminum sheet has the purpose to hinder the dispersion of the light emitted by the lamp.

In contact with the lower surface of the panel an opaque white Altuglas 213 20493 sheet, having a 5 mm thickness, produced by Atoglas, is placed., Lighting System C (on Two Edges)

The system is constituted by two lighting systems, each identical to the system A, placed on two opposite edges of the panel. Furthermore, at about 3 cm below the panel an opaque white Altuglas 213 20493 sheet, having a 5 mm thickness, by Atoglas, is placed.

Diffused Light Intensity Detectors

Detector 1—luxmeter RS 180—7133 with option F (fluorescent) for source of light selection. The values reported in the following Tables are the average ones and they refer to an average detection time of each measurement of about 10 sec.

Detector 2—luxmeter LAP N° 3091 F photoelectrical cell 67.

EXAMPLE 2

Panel (Composite) Formed by Two Layers, Obtained by Compression Molding

The panel base layer consists of transparent PMMA having a thickness of about 8 mm and 270×270 mm sizes, obtained by an Altuglas® 200 10.000 sheet having a 8 mm nominal thickness, produced by Atoglas.

The diffusing layer is constituted by PMMA and barium sulphate particles: a leaf having a 450±50 $\mu$m thickness is obtained by extruding with a conventional monoscrew extruder equipped with degassing, with standard thermal profile for PMMA, a blend constituted for 99.5% of Altuglas® BS 9EL beads, produced by Atoglas and for 0.5% of Blanc Fixe® K3 powder produced by Sachtleben Chemie, containing 99% of BaSO4 barium sulphate, having an average particle size of 8 $\mu$m.

In order to obtain the double layer panel, the above described sheet and leaf are coupled by compression molding by using a 60 ton Potvel compression press; the coupling temperature is of about 150° C., with a maximum total plasticization and compression cycle of about 30 minutes. The cooling cycle is of about 5–10 minutes. The sheet extraction temperature is of about 70° C. By using this preparation method in the obtained panel the thickness of the diffusing layer can result not perfectly uniform.

The panel has a Transmittance value of 89% and an Haze of 40%, measured by Hazemeter according to the ASTM D 1003 method.

EXAMPLE 2a

Luminious Diffusion Measurements Carried Out by using a Source of Light According to the System A of Example 1

Diffused light measuements are carried out in dark room with the detector 1, by moving the detector photoelectrical cell, kept into contact with the free surface of the upper layer containing barium sulphate, in determined positions, at different distances from the source of light. The opaque white sheet is put into contact with the lower panel layer. At the top of Table 1 columns the distances, measured with reference to the external surface of the metallic structure containing the lamp, at which the values of the diffused luminous intensity have been determined, are reported.
In the first column on the left the absolute value in Lux, determined at a 3 cm distance from the lamp external metallic structure (4 cm from the lamp surface) is then reported. In the other columns the diffused light intensity values are expressed as percentages with respect to the preceding absolute value.

TABLE 1

| 3 (cm) 490 (Lux) 100% | 7 86% | 9 80% | 12.5 68% | 15 67% | 17 63% | 19 60% | 22 53% |
|---|---|---|---|---|---|---|---|

EXAMPLE 2b

Luminous Diffusion Measurements with Two Sources of Light Placed on Two Opposite Sides of the Panel According to the System C of Example 1

Diffused light measurements are carried out in dark room by using the detector 1, by moving the detector photoelectrical cell, kept into contact with the free surface of the upper layer containing barium sulphate, in the same positions with respect to the source of light as indicated in the preceding Example 2a. The opaque white sheet is positioned at 3 cm from the lower panel layer. Table 2 reports, as the preceding Table 1:

The absolute value of the diffused luminous intensity, expressed in Lux, measured at 3 cm with respect to the external surface of one of the two metallic structures containing the lamps, as indicated in Example 2a.

The diffused luminous intensity value, measured at different distances, expressed as percentage with respect to the previous absolute value of diffused light intensity.

TABLE 2

| 3 (cm) 500 (Lux) 100% | 7 114% | 9 — | 12.5 115% | 15 114% | 17 — | 19 113% | 22 500 (Lux) 100% |
|---|---|---|---|---|---|---|---|

EXAMPLE 2c

Example 2b has been repeated under the same above mentioned conditions, but by using the detector 2 of Example 1. The following Table 3 shows the obtained results. The trend of the per cent diffused luminous intensity is similar to that of Table 2.

TABLE 3

| 3 (cm) 420 (Lux) 100% | 7 113% | 9 113% | 12.5 114% | 15 115% | 17 115% | 19 — | 22 420 (Lux) 100% |
|---|---|---|---|---|---|---|---|

EXAMPLE 2d

The determinations have been carried out as in Example 2b, but using the panel in upturned position, so that the diffusing layer containing the barium sulphate was placed below, in the lowest position, with respect to the base layer and placing the detector cell into contact with the PMMA layer as such (base sheet): the results are reported in Table 4 and they show that the diffusing effect is similar.

TABLE 4

| 3 (cm) 488 (Lux) 100% | 7 111% | 9 110% | 12.5 110% | 15 110% | 17 111% | 19 112% | 22 490 (Lux) 100% |
|---|---|---|---|---|---|---|---|

EXAMPLE 3

Three Layer Panel Obtained by Compression Molding

In the three layer panel the intermediate layer is the transparent base layer, formed of PMMA as such, having a thickness of about 8 mm, obtained by an Altuglas® 200 10.000 sheet, 8 mm of nominal thickness, produced by Atoglas, having 270×270 mm sizes.

The two external layers are constituted by PMMA and barium sulphate: two leaves of 200±10 $\mu$m thickness are obtained by extruding with a conventional monoscrew extruder, equipped with degassing, with standard thermal profile for PMMA, a blend containing 99.4% of Altuglas® BS 9EL beads produced by Atoglas and 0.6% of Blanc Fixe® K3 powder produced by Sachtleben Chemie, containing 99% of barium sulphate with particle average size of 8 $\mu$m.

The two leaves having a low thickness are coupled to the two surfaces of the 8 mm sheet by compression molding, using a 60 tons compression Potvel press: the coupling temperature is of about 155° C., with a plasticization and compression maximum total cycle of about 30 minuts. The cooling cycle is of about 5–10 minutes. The sheet extraction temperature is of about 70° C.

The obtained panel has a Transmittance value of 89% and a Haze of 40%, measured by Hazemeter according to the ASTM D 1003 standard.

EXAMPLE 3a

Measurements of Luminous Diffusion Carried Out by using a Source of Light According to the System A of Example 1.

Diffused light measurements are carried out in dark room according to the methods described in Ex. 2a, by using the detector 1. In Table 5 the absolute value of the diffused luminous intensity, expressed in Lux, measured at 3 cm from the edge of the metallic structure in which the lamp is contained and the value of the diffused luminous intensity, measured at different distances with respect to the source of light as mentioned in Ex. 2a, expressed as percentage with respect to the previous absolute value of diffused light intensity, are reported.

TABLE 5

| 3 (cm) | 7 | 9 | 12.5 | 15 | 17 | 19 | 22 |
|---|---|---|---|---|---|---|---|
| 530 (Lux) 100% | 84% | 75% | 63% | 60% | 58% | 55% | 50% |

EXAMPLE 3b

Luminous Diffusion Measurements with Two Sources of Light Placed on Two Opposite Panel Sides According to the System C of Example 1

Diffused light measurements are carried out in dark room by using detector 1, by moving the detector photoelectrical cell, kept into contact with the free surface of the upper layer containing barium sulphate, at the same positions with respect to the source of light as mentioned in Ex. 2a. The opaque white sheet is placed at 3 cm from the lower layer of the panel. The results are reported in Table 6.

TABLE 6

| 3 (cm) | 7 | 9 | 12.5 | 15 | 17 | 19 | 22 |
|---|---|---|---|---|---|---|---|
| 520 (Lux) 100% | 105% | 103% | 100% | 102% | 102% | 102% | 520 (Lux) 100% |

EXAMPLE 4

Two-layer Coextruded Panel

The lower panel layer (base layer) is constituted by transparent PMMA, having a thickness of about 3.7 mm, obtained by extruding Oroglas® V045 grains produced by Atoglas.

The diffusing layer, having a thickness of about 100 μm, constituted by PMMA and barium sulphate, is obtained by extruding PMMA Oroglas® V045 grains charged with master batch containing Blanc Fixe® K3 powder produced by Sachtleben Chemie, said powder being formed for 99% of barium sulphate having a particle average size of about 8 μm, such that the barium sulphate content in the diffusing layer is 0.6% by weight.

The coextruder with calender is constituted by two monoscrew extruders equipped with degassing: the materials are extruded by using a conventional thermal profile for PMMA.

The obtained sheet has a 30 cm width.

The obtained panel has a Transmittance value of 91% and a Haze of 15% measured by Hazemeter according to the ASTM D 1003 method.

EXAMPLE 4a

Luminous Diffusion Measurements Determined using a Source of Light According to the System B of Example 1

Diffused light measurements are carried out in dark room with the detector 1, by moving the detector photoelectrical cell kept into contact with the free surface of the upper layer containing barium sulphate, in determined positions, at different distances, calculated by referring to the lamp external surface, indicated in the following Table 7. The opaque white sheet is placed into contact with the lower panel layer. The results are reported in Table 7.

TABLE 7

| 10 (cm) | 15 | 20 |
|---|---|---|
| 660 (Lux) | 77% | 55% |

EXAMPLE 5 (COMPARATIVE)

Panel Containing in the Diffusing Layer Titaniun Dioxide Instead of Barium Sulphate An identical two layer panel, with the same sizes and thickness of the base layer and diffusing layer, as the one described in Example 2, obtained by the same compression molding method, is used. The oxide contained in the diffusing layer, obtained by the same extrusion method of the leaf containing barium sulphate, is titanium dioxide (Kronos® 2210 by Kronos Titan having a titre of about 94%) in percentage by weight on the layer total weight of 0.3%.

The obtained two-layer panel has a Transmittance value of 33% and a Haze of 100%, measured by Hazemeter according to ASTM D 1003 method.

EXAMPLE 5a (COMPARATIVE)

Luminous Diffusion Measurements Determined by using a Source of Light According to the System A of Example 1

On the so prepared sheet diffused light measurements are carried out in dark room with the detector 1, by moving the detector photoelectrical cell, kept into contact with the free surface of the upper layer containing titanium dioxide, at the same positions with respect to the source of light as mentioned in Ex. 2a. The opaque white sheet is placed into contact with the lower panel layer. The results are reported in Table 8. At the top of the columns the distances, measured from the external surface of the metallic structure containing the lamp, at which the diffused luminous intensity values have been determined, are reported. In the first column on the left the absolute value in Lux is reported, determined at the distance of 3 cm (about 4 cm from the lamp surface). In the other columns the diffused light intensity values are expressed as percentage with respect to the preceding absolute value of diffused light intensity.

TABLE 8

| 3 (cm) | 7 | 9 | 12.5 | 15 | 17 | 19 | 22 |
|---|---|---|---|---|---|---|---|
| 920 (Lux) 100% | 52% | 39% | 25% | 18% | 14% | 12% | 10% |

EXAMPLE 5b (COMPARATIVE)

Luminous Diffusion Measurements with Two Sources of Light Placed on Two Opposite Panel Sides According to system C of Example 1

On the panel prepared in the preceding Example 5 diffused light measurements are carried out in dark room by using the detector 1, by moving the detector photoelectrical cell, kept into contact with the free surface of the upper layer containing titanium dioxide, in the same positions mentioned in the preceding Ex. 2a. The opaque white sheet is placed at 3 cm from the lower layer of the panel. The results are reported in Table 9.

TABLE 9

| 3 (cm) | 7 | 9 | 12.5 | 15 | 17 | 19 | 22 |
|---|---|---|---|---|---|---|---|
| 920 (Lux) | | | | | | | 920 (Lux) |
| 100% | 79% | 73% | 62% | 69% | 75% | 82% | 100% |

What is claimed is:

1. A thermoplastic composite panel, comprising a base transparent thermoplastic layer, conducting the light, having a thickness generally in the range 3–40 mm and a diffusing light layer, having a thickness in the range 10–1500 micron, placed on one or both surfaces of the base layer, said diffusing layer constituted by thermoplastic material containing barium sulphate in amount by weight, expressed as per cent ratio on the total weight of the diffusing layer, in the range 0.01–2%, the barium sulphate having average particle sizes in the range 0.1–50 micron, the composite sides being at least $\geq 10$ cm, said composite having one or more edge lit, the composite area being greater than 100 $cm^2$.

2. A panel according to claim 1, wherein the composite panel contains only one diffusing layer.

3. A panel according to claim 1, wherein a source of the light is placed on two opposite edges.

4. A panel according to claim 1, wherein the thermoplastic material of which the base layer and the diffusing layer containing barium sulphate are constituted, is selected from a (meth)acrylic (co)polymer, polycarbonate, polystyrene, PET, copolyesters constituted by glycol modified PET chosen from the group consisting of dietylenglycol, butandiol, hexandiol and 1,4-cyclohexane dimethanol or mixtures of PET with the copolymers.

5. A panel according to claim 4 wherein the thermoplastic (meth)acrylic (co)polymer is constituted by an alkyl (meth) acrylate homopolymer or by a copolymer derived from an alkyl (meth)acrylate with at least one monomer having one or more ethylenic unsaturations copolymerizable with the alkyl (meth)acrylate.

6. A panel according to claim 5 wherein the alkyl (meth) acrylate is selected from the compounds wherein the alkyl group has from 1 to 8 carbons.

7. A panel according to claim 4, wherein the thermoplastic polymer is constituted by methyl methacrylate homopolymers or methylmethacrylate copolymers with (meth) acrylic esters or (meth) acrylic acids.

8. A panel according to claim 7 wherein the thermoplastic polymer is constituted by methylmethacrylate/alkyl acrylate copolymers.

9. A panel according to claim 5 wherein the (meth)acrylic thermoplastic (co)polymer comprises from 70 to 100% by weight of alkyl methacrylate and from 0 to 30% by weight of one or more comonomers containing one or more ethylenic unsaturations, said comonomers being copolymerizable with the alkyl methacrylate.

10. A panel according to claim 1, wherein the composite panel is obtained by coextrusion, by casting, or by compression molding or by coupling of a film in calendaring, or optionally by gluing.

11. A panel according to claim 10, wherein the composite is prepared by coextrusion of the base sheet of thermoplastic polymer and of the diffusing layer of thermoplastic polymer containing the barium sulphate, or by compression molding of the thermoplastic polymer layer containing barium sulphate, obtained by extrusion, on a base sheet of thermoplastic polymer, said sheet obtained by extrusion or casting.

12. A panel according to claim 1, wherein one or more edges of the composite panel, on which the source of light Is not positioned, a reflecting film is placed.

13. A panel according to claim 1, wherein the thermoplastic polymer of the base sheet can contain particles of substances diffusing light, both of polymeric and inorganic type.

14. A panel according to claim 13 wherein the polymeric particle average sizes are in the range 0.1–200 micron, the amount is in the range 5–1000 ppm.

15. A panel according to claim 1 wherein on the free surface of the composite base sheet parallel adhesive bands are present, having a with from 0.5 mm to 20 mm, placed at a distance the one from the other within the indicated limits, said distance being also greater than the band width.

16. Luminous signs comprising the composite panel of claim 1.

17. A panel according to claim 1, wherein the thermoplastic polymer is constituted by methyl methacrylate homopolymers.

* * * * *